United States Patent
Li et al.

(10) Patent No.: US 10,407,606 B2
(45) Date of Patent: Sep. 10, 2019

(54) HIGH TEMPERATURE VISCOELASTIC SURFACTANT (VES) FLUIDS COMPRISING NANOPARTICLE VISCOSITY MODIFIERS

(71) Applicant: Saudi Arabian Oil Company, Dhahran (SA)

(72) Inventors: Leiming Li, Sugar Land, TX (US); Sehmus Ozden, Houston, TX (US); Ghaithan A. Al-Muntasheri, Houston, TX (US); Feng Liang, Cypress, TX (US)

(73) Assignee: Saudi Arabian Oil Company, Dhahran (SA)

( * ) Notice: Subject to any disclaimer, the term of this patent is extended or adjusted under 35 U.S.C. 154(b) by 52 days.

(21) Appl. No.: 15/581,449

(22) Filed: Apr. 28, 2017

(65) Prior Publication Data
US 2017/0327722 A1   Nov. 16, 2017

Related U.S. Application Data

(60) Provisional application No. 62/335,377, filed on May 12, 2016.

(51) Int. Cl.
  *C09K 8/035*   (2006.01)
  *C09K 8/06*    (2006.01)
  (Continued)

(52) U.S. Cl.
  CPC .......... *C09K 8/035* (2013.01); *C09K 8/06* (2013.01); *C09K 8/602* (2013.01); *C09K 8/68* (2013.01);
  (Continued)

(58) Field of Classification Search
  CPC ............ C09K 2208/10; C09K 2208/26; C09K 2208/30; C09K 8/035; C09K 8/06; C09K 8/602; C09K 8/68; C09K 8/74
  See application file for complete search history.

(56) References Cited

U.S. PATENT DOCUMENTS

| | | |
|---|---|---|
| 3,401,094 A | 9/1968 | Lindsay, Jr. |
| 4,930,575 A | 6/1990 | Falk |
| | (Continued) | |

FOREIGN PATENT DOCUMENTS

| | | |
|---|---|---|
| CN | 105112041 A | 12/2015 |
| EP | 1634938 A1 | 3/2006 |
| | (Continued) | |

OTHER PUBLICATIONS

Hull, et al. "Recent Advances in Viscoelastic Surfactants for Improved Production from Hydrocarbon Reservoirs" Society of Petroleum Engineers, SPE International Symposium on Oil Field Chemistry held Apr. 13-15, 2017.
(Continued)

*Primary Examiner* — Alicia Bland
(74) *Attorney, Agent, or Firm* — Dinsmore & Shohl LLP

(57) ABSTRACT

In accordance with one or more embodiments, this disclosure describes a viscoelastic fluid for a subterranean formation comprising: viscoelastic surfactant comprising the general formula:

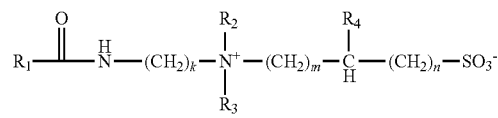

where $R_1$ is a saturated or unsaturated hydrocarbon group of from 17 to 29 carbon atoms, $R_2$ and $R_3$, are each independently selected from a straight chain or branched alkyl or hydroxyalkyl group of from 1 to 6 carbon atoms; $R_4$ is selected from H, hydroxyl, alkyl or hydroxyalkyl groups of from 1 to 4 carbon atoms; k is an integer of from 2-20; m is an integer of from 1-20; and n is an integer of from 0-20;
(Continued)

brine solution; and at least one nanoparticle viscosity modifier comprising a particle size of 0.1 to 500 nanometers, or 0.1 to 100 nanometers.

18 Claims, 2 Drawing Sheets

(51) Int. Cl.
  *C09K 8/68* (2006.01)
  *C09K 8/74* (2006.01)
  *C09K 8/60* (2006.01)
(52) U.S. Cl.
  CPC ............ *C09K 8/74* (2013.01); *C09K 2208/10* (2013.01); *C09K 2208/26* (2013.01); *C09K 2208/30* (2013.01)

(56) References Cited

U.S. PATENT DOCUMENTS

| | | | |
|---|---|---|---|
| 7,081,439 B2 | 7/2006 | Sullivan et al. | |
| 7,244,694 B2 | 7/2007 | Fu et al. | |
| 7,380,606 B2 | 7/2008 | Pursley et al. | |
| 7,392,848 B1 | 7/2008 | Bader | |
| 7,461,694 B2 | 12/2008 | Dahanayake et al. | |
| 7,703,531 B2 | 4/2010 | Huang et al. | |
| 9,080,043 B2 | 7/2015 | Yuan-Huffman et al. | |
| 9,341,052 B2 | 5/2016 | Gadberry et al. | |
| 2005/0107265 A1 | 5/2005 | Sullivan et al. | |
| 2005/0119401 A1 | 6/2005 | Bavouzet et al. | |
| 2006/0046937 A1 | 3/2006 | Fu et al. | |
| 2006/0054324 A1 | 3/2006 | Sullivan et al. | |
| 2008/0153720 A1* | 6/2008 | Huang | C09K 8/68 507/271 |
| 2008/0182762 A1 | 7/2008 | Huang et al. | |
| 2008/0190615 A1 | 8/2008 | Drochon | |
| 2009/0111716 A1 | 4/2009 | Hough et al. | |
| 2010/0022418 A1 | 1/2010 | Milne et al. | |
| 2013/0274170 A1* | 10/2013 | Yuan-Huffman | A61Q 19/00 510/337 |
| 2014/0076572 A1* | 3/2014 | Gadberry | C09K 8/602 166/308.4 |
| 2015/0315457 A1 | 11/2015 | Ali et al. | |
| 2015/0368547 A1 | 12/2015 | Lesko et al. | |
| 2016/0176734 A1 | 6/2016 | Wahid | |
| 2016/0017210 A1 | 7/2016 | Li et al. | |
| 2016/0355723 A1 | 12/2016 | Yadav et al. | |
| 2016/0356107 A1 | 12/2016 | Sarmah et al. | |
| 2017/0197853 A1 | 7/2017 | Chudasama et al. | |

FOREIGN PATENT DOCUMENTS

| | | |
|---|---|---|
| WO | 03056130 A1 | 7/2003 |
| WO | 2008036812 A2 | 3/2008 |
| WO | 2008100436 A1 | 8/2008 |
| WO | 2008151331 A1 | 12/2008 |
| WO | 2012160008 A1 | 11/2012 |
| WO | 2013036415 A2 | 3/2013 |
| WO | 2014140055 A1 | 9/2014 |
| WO | 2016083318 A1 | 6/2016 |
| WO | 2016083322 A1 | 6/2016 |
| WO | 2016196812 A1 | 12/2016 |

OTHER PUBLICATIONS

International Search Report and Written Opinion pertaining to PCT/US2017/031201 dated Jun. 20, 2017.
International Search Report and Written Opinion pertaining to PCT/US2017/031195 dated Jul. 12, 2017.
U.S. Non-Final Office Action dated Oct. 26, 2017 pertaining to U.S. Appl. No. 15/581,408, 14 Pages.
International Search Report and Written Opinion pertaining to International Application No. PCT/US2018/040199 filed Jun. 29, 2018, 18 pages.
Final Office Action dated Mar. 9, 2018 pertaining to U.S. Appl. No. 15/581,408, filed Apr. 28, 2017, 9 pages.
U.S. Office Action dated Jun. 28, 2019 pertaining to U.S. Appl. No. 15/661,596 filed Jul. 27, 2017, 34 pgs.
Office Action dated Apr. 28, 2019 pertaining to Gulf Cooperation Council Application No. 2017/33396.

* cited by examiner

HIGH TEMPERATURE VISCOELASTIC SURFACTANT (VES) FLUIDS COMPRISING NANOPARTICLE VISCOSITY MODIFIERS

CROSS-REFERENCE

This application claims priority to U.S. Provisional Patent Application Ser. No. 62/335,377 filed Apr. 12, 2016, which is incorporated by reference herein in its entirety.

TECHNICAL FIELD

Embodiments of the present disclosure generally relate to fluid fracturing of subterranean formations in hydrocarbon reservoirs to enhance the flow of hydrocarbons to a wellbore in the formation, and more specifically relate to high temperature viscoelastic surfactant ("VES") fracturing fluids comprising nanoparticle viscosity modifiers.

BACKGROUND

Hydraulic fracturing is a well stimulation technique that involves injecting a fracturing fluid into subterranean formations at rates and pressures sufficient to rupture the subterranean formation to produce or widen compressed flow conduits, that is fissures, cracks, natural fractures, faults, lineaments and bedding planes. Viscoelastic surfactants (VES) fluids are often used in oilfield applications, such as hydraulic fracturing. Specifically, the VES fluids exhibit both elastic behavior and viscous behavior due to the micelles structure formed under different conditions. When the VES fluid is subjected to shear stress, for example, by a pump, the VES fluid is shear thinned to produce a low viscosity fluid, which is easier to pump. When the shear stress is stopped, the VES fluid returns to a higher viscosity condition. Because the fracturing fluid contains a proppant that keeps an induced hydraulic fracture open after the pressure is released, a higher viscosity enables the VES fluid to suspend and transport the proppant into the fracture.

Regarding the surfactant aggregation, the VES fluid includes wormlike micelles that become entangled to form a 3-dimensional (3D) viscoelastic gel, limiting mobility of solution molecules, for example water. Due to the advantages, such as low subterranean formation damage, good proppant suspending and carrying ability, good compatibility with brine and produced water, the VES fluids have been widely used in oilfield operations including fracturing, completion, acidizing, sand control, water shut-off, etc.

However, current viscoelastic fluid systems have a temperature limit of approximately 250 degrees Fahrenheit (° F.) beyond which the fluid viscosity is unsuitable for fracturing application.

SUMMARY

Ongoing needs exist to obtain high viscosities at higher temperatures, while using less high temperature viscoelastic surfactant (HT VES). This disclosure provides a formulation which achieves a higher viscosity while reducing the amount of HT VES or keeping the same amount of HT VES needed to retain compatibility with the brine and proppant and maintaining a high viscosity at temperatures greater than 250° F.

Embodiments of the present disclosure are directed to hydraulic fracturing treatments of underground oil and gas bearing formations. The fracturing fluids must be stable at high temperature and stable at high pump rates and shear rates. The embodiments found in this disclosure are designed to effectively lower the amount of HT VES needed at 250-350° F., and maintaining a similar viscosity through the use of selected nanomaterials. The viscoelastic fluids could be enhanced with nanoparticles, thereby resulting in higher fluid viscosity. The selected nanoparticles may have, through forces such as van der Waals forces, simultaneously attached to multiple HT VES micelles in the fluid, thus strengthening the 3D network of the HT VES micelles.

In accordance with one or more embodiments, this disclosure describes a viscoelastic surfactant fluid for a subterranean formation comprising: brine solution, at least one nanoparticle viscosity modifier comprising a particle size of 0.1 to 100 nanometers, and a viscoelastic surfactant according to formula (I):

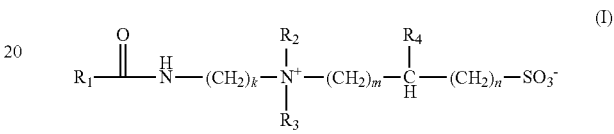

In formula (I), $R_1$ is a saturated or unsaturated hydrocarbon group of from 17 to 29 carbon atoms, $R_2$ and $R_3$, are each independently selected from a straight chain or branched alkyl or hydroxyalkyl group of from 1 to 6 carbon atoms. $R_4$ is selected from H, hydroxyl, alkyl or hydroxyalkyl groups of from 1 to 4 carbon atoms. k is an integer of from 2-20; m is an integer of from 1-20, and n is an integer of from 0-20.

In accordance with one or more embodiments, this disclosure describes a method of treating a subterranean formation penetrated with a viscoelastic surfactant fluid comprising viscoelastic surfactant and nanoparticles viscosity modifier in a brine solution to produce the viscoelastic fluid, where the viscoelastic surfactant according to formula (I):

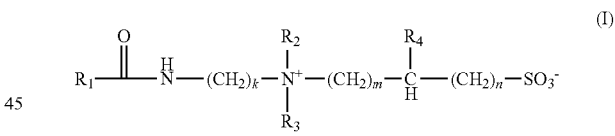

where $R_1$ is a saturated or unsaturated hydrocarbon group of from 17 to 29 carbon atoms. $R_2$ and $R_3$ are each independently selected from a straight chain or branched alkyl or hydroxyalkyl group of from 1 to 6 carbon atoms. $R_4$ is selected from H, hydroxyl, alkyl or hydroxyalkyl groups of from 1 to 4 carbon atoms. k is an integer of from 2-20; m is an integer of from 1-20; and n is an integer of from 0-20; and at least one nanoparticle viscosity modifier comprising a particle size of 0.1 to 100 nanometers. The viscoelastic fluid is introduced into the subterranean formation, where the treatment fluid is subjected to temperatures greater than 250° F.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawings.

BRIEF DESCRIPTION OF THE DRAWINGS

FIG. 1 is a graph of viscosity in centipoise (cP) at a 100 per second (/s) shear rate as a function of temperature in degree Fahrenheit (° F.). The viscoelastic fluid samples include the baseline fluid, the baseline fluid with 6 ppt (dark solid line), and the baseline fluid with 12 ppt (grey solid line), respectively, of carbon nanotubes.

FIG. 2 is a graph of viscosity in cP at a 100/s shear rate as a function of temperature in degrees Fahrenheit. The samples include the baseline fluid, the baseline fluid with 4 ppt of $ZrO_2$ nanomaterial, and a calculated curve by simple addition of the baseline curve and a 4 ppt $ZrO_2$ nanomaterial curve represent by the dotted line.

Figure 1:
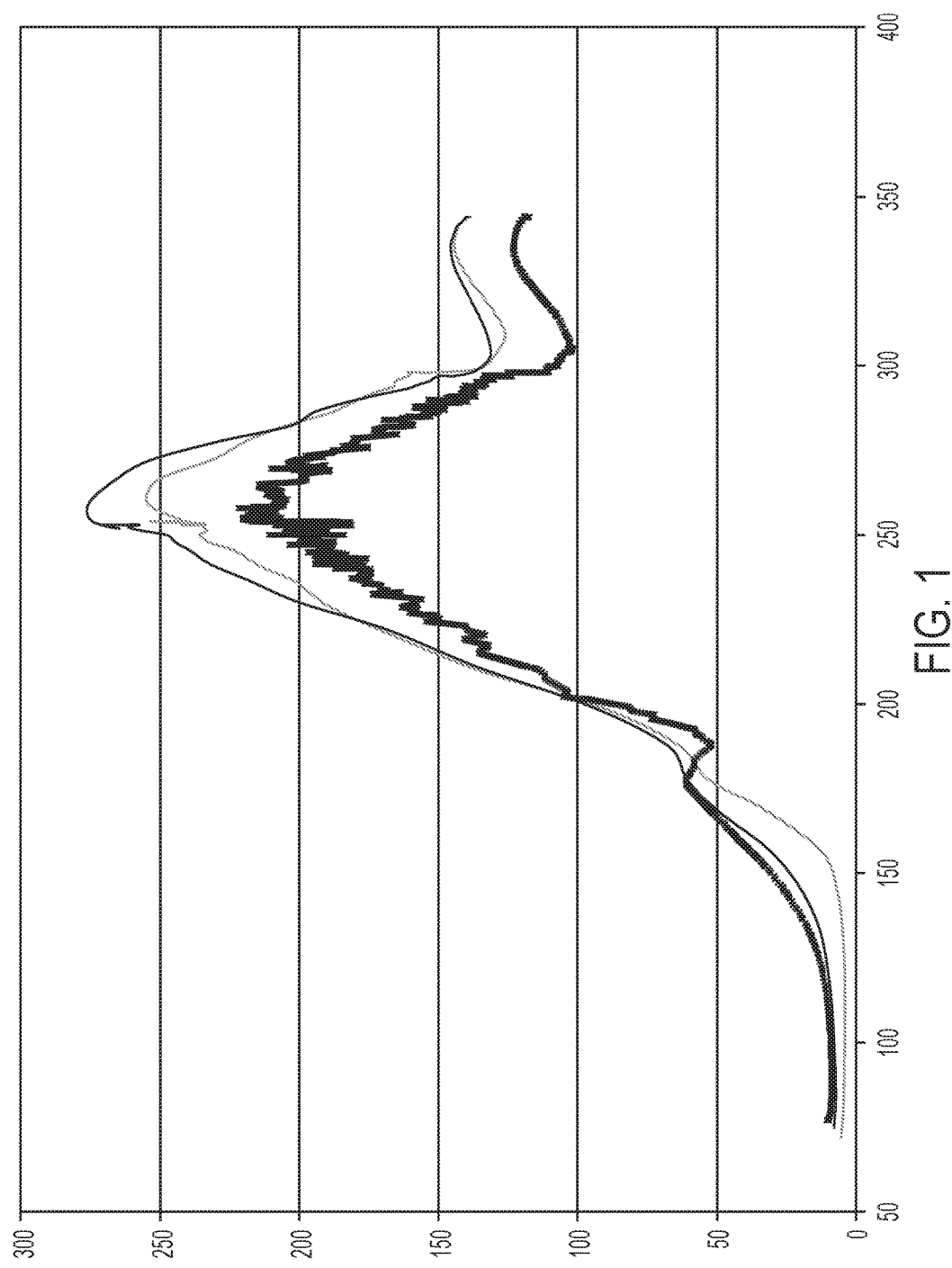
FIG. 1 and FIG. 2 depict a baseline curve of a viscoelastic fluid. The viscoelastic fluid, "baseline fluid," as denoted by the thickest black line (due to the backslashes) in FIG. 1 and FIG. 2, comprises 5% HT VES and brine.

The embodiments set forth in the drawings are illustrative in nature and not intended to be limiting to the claims. Moreover, individual features of the drawings will be more fully apparent and understood in view of the detailed description.

DETAILED DESCRIPTION

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

Unless otherwise defined, all technical and scientific terms used in this disclosure have the same meaning as commonly understood by one of ordinary skill in the art. The terminology used in the description is for describing particular embodiments only and is not intended to be limiting. As used in the specification and appended claims, the singular forms "a," "an," and "the" are intended to include the plural forms as well, unless the context clearly indicates otherwise.

As used in this disclosure, "approximately" is used to address the fluctuation and slight imprecision often associated with measurements, such as measurements associated with reaction conditions. For example, when approximately refers to a percentage, then "approximately" includes plus or minus 1%. When approximately refers to a temperature or temperature range, then "approximately" includes plus or minus 10 degrees. The disclosure of any ranges in the specification and claims are to be understood as including the range itself and also anything subsumed within the range, as well as endpoints. Unless otherwise indicated, the numerical properties set forth in the specification and claims are approximations that may vary depending on the desired properties sought to be obtained in embodiments of the present disclosure. Notwithstanding that numerical ranges and parameters setting forth the broad scope of this disclosure are approximations, the numerical values set forth in the specific examples are reported as precisely as possible. Any numerical values, however, inherently contain certain errors necessarily resulting from error found in their respective measurements.

As used in this disclosure, "water" includes deionized water, distilled water, brackish water, brine, fresh water, spring water, tap water, mineral water or water substantially free of chemical impurities.

Embodiments of the present disclosure are directed to hydraulic fracturing treatments of underground oil and gas bearing formations, and generally relates to viscoelastic compositions or fluids, and to methods of using those fluids or compositions. This disclosure describes a viscoelastic surfactant fluid that maintains high viscosity at temperature of 200° F. or greater. The combination of viscoelastic surfactant, nanoparticle viscosity modifier and brine increases the viscosity, while using less of a high temperature viscoelastic surfactant (HT VES). The viscoelastic surfactant fluid in this disclosure can be used to stimulate or modify the permeability of underground formations, in drilling fluids, completion fluids, workover fluids, acidizing fluids, gravel packing, fracturing and the like.

The viscosity of a viscoelastic fluid may vary with the stress or rate of strain applied. In the case of shear deformations, it is very common that the viscosity of the fluid drops with increasing shear rate or shear stress. This behavior is referred to as "shear thinning." Surfactants can cause viscoelasticity in fluids and may manifest shear thinning behavior. For example, when such a fluid is passed through a pump or is in the vicinity of a rotating drill bit, the fluid is in a higher shear rate environment and the viscosity is decreased, resulting in low friction pressures and pumping energy savings. When the stress is removed, the fluid returns to a higher viscosity condition.

At elevated temperatures, the average kinetic energy of the molecules in the fluid increases, causing more disruptions to the VES micelle structures and the attractions among the micelles. This can lower the overall viscosity of the fluid. Generally speaking, an increase in temperature correlates to a logarithmic decrease in the time required to impart equal strain under a constant stress. In other words, it takes less work to stretch a viscoelastic material an equal distance at a higher temperature than it does at a lower temperature. The addition of selected nanoparticles to the fluid may improve the fluid viscosity at elevated temperatures. The selected nanoparticles may have, through forces such as van der Waals forces, simultaneously attached to multiple HT VES micelles in the fluid, thus strengthening the 3D network of the HT VES micelles.

One embodiment described in this disclosure is a viscoelastic fluid for a subterranean formation comprising viscoelastic surfactant according to formula (I), a brine solution, and a nanoparticle viscosity modifier.

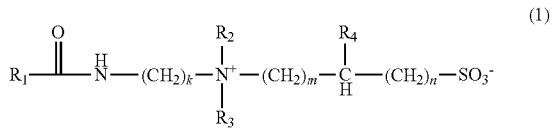

(1)

In formula (I), $R_1$ is a saturated or unsaturated hydrocarbon group of from 17 to 29 carbon atoms. In other embodiments, $R_1$ is a saturated or unsaturated, hydrocarbon group of 18 to 21 carbon atoms. $R_1$ can also be a fatty aliphatic derived from natural fats or oils having an iodine value of from 1 to 140. The iodine value, which determines the degree of unsaturation, can range from 30 to 90, or in other embodiments the $R_1$ has an iodine value of 40 to 70. $R_1$ may be restricted to a single chain length or may be of mixed chain length such as those groups derived from natural fats and oils or petroleum stocks. The natural fats and oils or petroleum stocks may comprise tallow alkyl, hardened tallow alkyl, rapeseed alkyl, hardened rapeseed alkyl, tall oil alkyl, hardened tall oil alkyl, coco alkyl, oleyl, erucyl, soya alkyl, or combinations thereof.

In one embodiment, the formula (I) of the viscoelastic surfactant, $R_2$ and $R_3$ are each independently selected from a straight chain or branched alkyl or hydroxyalkyl group of from 1 to 6 carbon atoms, in other embodiments from 1 to 4 carbon atoms, and in another embodiment from 1 to 3 carbon atoms. $R_4$ is selected from H, hydroxyl, alkyl or hydroxyalkyl groups of from 1 to 4 carbon atoms, and can be selected from ethyl, hydroxyethyl, hydroxyl or methyl, but is not limited to this list of groups.

The formula (I) of the viscoelastic surfactant has the variables subscript k, m, and n. In one embodiment, subscript k is an integer of from 2 to 20, in other embodiments, from 2 to 12, and in another embodiment from 2 to 4. Subscript m is an integer of from 1 to 20, in other embodiments from 1 to 12, in another embodiment from 1 to 6, and in some embodiments, m can also be an integer from 1 to 3. Subscript n is an integer of from 0 to 20, from 0 to 12, or from 0 to 6. In some embodiments, n is an integer from 0 to 1.

One embodiment of the viscoelastic surfactant is erucamidopropyl hydroxypropylsultaine; commercially known as Armovis EHS®, provided by Akzo Nobel. In some embodiments, the formula (I) further comprises a high temperature viscoelastic surfactant. In one or more embodiments, the viscosity modifier of this disclosure comprises non-polymeric nanoparticles.

The viscoelastic surfactant may form viscoelastic fluids at lesser concentrations than other surfactants. This specific rheological behavior is mainly due to the types of surfactant aggregates that are present in the fluids. In low viscosity fluids, the surfactant molecules aggregate in spherical micelles. Whereas in viscoelastic fluids, long micelles, which can be described as worm-like, thread-like or rod-like micelles, are present and entangled. These long flexible wormlike micelles can form in the presence of salt, and by entangling, they form a transient network and impart viscoelastic properties to the solution. These micelles can thus function as thickening and rheology control agents in aqueous systems. Wormlike micelles are in thermal equilibrium with their monomers. Thus, micellar self-assembly (and hence, their length and flexibility) responds to changes in surfactant and salt concentration, as well as changes in temperature.

The viscoelastic fluid in this disclosure incorporates a lesser percent by weight of the viscoelastic surfactant. The amount of viscoelastic surfactant in the viscoelastic fluid can vary. In some embodiments, the viscoelastic fluid contains 0.5% by weight to 20% by weight of viscoelastic surfactant. Whereas in another embodiment, the viscoelastic fluid comprises 2% by weight to 8% by weight of viscoelastic surfactant. Other embodiments of the viscoelastic surfactant fluid comprise a viscoelastic fluid having 3% by weight to 6% by weight of viscoelastic surfactant.

Though viscoelastic surfactants can form networks in lower concentrations compared to other surfactants, the viscosity modifiers, such as carbon nanotubes or zirconium (IV) oxide ($ZrO_2$) nanoparticles, associate with surfactant micelles in aqueous viscoelastic solutions to better form networks that suspend or prevent the proppant from settling. If the proppant settles too quickly, it may accumulate at the bottom part of the fracture, clogging the fracture, and decreasing productivity. When the nanoparticles are in a powder formulation, they are better able to disperse and combine with the micelles, and, as a result, this increases the viscosity beyond expected values. The powder formulation, comprising nanoparticle viscosity modifiers, depends on the nanoparticle size, specifically, the nanoparticle diameter. In one embodiment, the nanoparticle viscosity modifier particle size is from 0.1 nanometers (nm) and 500 nm. In another embodiment, the particle size is from 10 nm to 60 nm. In other embodiments, the particle size is between 20 nm to 50 nm.

Nanoparticles describe materials having at least one unit sized (in at least one dimension) from 1 and 1000 nanometers ($10^{-9}$ meter), but is usually from 1 and 100 nm, which is an accepted definition of nano scale. The term "nanomaterials" encompasses other terms, such as, but not limited to: nanoparticles, nanotubes, nanorods, nanodots, or a combination thereof. Nanorods are solid one dimensional nanostructure and lack a hollow inner center that gives nanotubes a tubular structure. In one embodiment, the viscoelastic fluid comprises a nanoparticle viscosity modifier, which further comprises one or more of nanomaterials, such as carbon nanotubes, zinc oxide (ZnO), nanorods, $ZrO_2$ nanoparticles or combinations thereof. In other embodiments, the nanoparticle viscosity modifier comprises nano-sized zirconium (Zr) compounds, titanium (Ti) compounds, cesium (Ce) compounds, aluminum (Al) compounds, boron (B) compounds, tin (Sn) compounds, calcium (Ca) compounds, magnesium (Mg) compounds, iron (Fe) compounds, chromium (Cr) compounds, silica (Si) compounds, or combinations thereof.

As stated in a preceding paragraph, the viscoelastic fluid comprises nanoparticle viscosity modifiers. In one embodiment, the nanoparticle viscosity modifier ranges from 0.1 pound per thousand gallons (ppt) (about 0.001% by weight) to 5% by weight. In another embodiment, the viscoelastic fluid comprises about 0.04% to about 0.24% by weight nanoparticle viscosity modifier and in other embodiments 0.01% to 2% by weight nanoparticle viscosity modifier.

In some embodiments, additional surfactants are added into the viscoelastic fluid. Adding an additional surfactant may enhance the viscosity or effect the micelle formation at varying temperatures, pressures, or other changes in conditions. A non-limiting list of possible surfactants includes cationic surfactants, anionic surfactants, non-ionic surfactants, amphoteric surfactants, zwitterionic surfactants or combinations thereof.

Salts ionize when in solution, and the counterions compatible with the surfactant can penetrate into the hydrophobic interior of the micelles, which promotes self-assembly. Different concentrations of brine, or salt solutions, affect the micelle assembly differently. In one embodiment, the viscoelastic fluid comprises 1% by weight to 50% by weight of salt in brine solution. In another embodiment, the viscoelastic fluid comprises 10% by weight to 40% by weight of salt in brine solution, and other embodiments comprise 15% by weight to 35% by weight of salt in brine solution. Usually, the fluid contains about 1 to 6 wt % viscoelastic surfactant, 1 to 50 wt % salt, and the remaining percentage being primarily water.

As mentioned in the preceding paragraphs, different salts and salt concentrations can affect the micelle formation. The brine solution in the viscoelastic fluid comprises one or more metal salts. In some embodiments, the metal salts may comprise alkali or alkaline earth metal halides. A non-limiting list of metal halides include: calcium chloride, calcium bromide, zinc bromide, or combinations thereof. The sequence of addition of the components may vary. For example, before the salt in brine is added to solution, it may be combined with the nanoparticle viscoelastic surfactant to form a powder formulation, and when added to the solution or solvent, the powder formulation rapidly disperses.

Several solvents or combination of solvents may increase the performance of the viscoelastic surfactant. The solvent may comprise water, alcohol, or combinations thereof. The alcohol comprises alkyloxy, diol, triol or combination thereof. Examples of alkyloxy solvents include, but are not limited to methanol, ethanol, propanol, and butanol. Glycol molecules are dihydric alcohols or diols, and a non-limiting list of diol solvents includes: ethylene glycol, butylene glycol, diethylene glycol, glycerin, propylene glycol, tetramethylene glycol, tetramethylethylene glycol, trimethylene glycol, and the like.

Additional additives may be incorporated into the viscoelastic fluid to increase micelle formation, increase viscosity, or to enhance gel-strength, which is the force necessary to break the gel. Viscoelastic fluids in this disclosure may further contain one or more additives such as surfactants, salts, for example potassium chloride, anti-foam agents, scale inhibitors, corrosion inhibitors, fluid-loss additives, and bactericides. The purpose of a breaker is to "break" or diminish the viscosity of the fracturing fluid so that this fluid is more easily recovered from the fracture during clean-up. Breakers are different from stabilizer nanoparticles in that stabilizer nanoparticles inhibit or prevent the degradation of at least one VES. In some embodiments, the viscoelastic fluids containing nanoparticles may also comprise breaker material. The breaker material comprises encapsulated breaker. Additional additives may include, but are not limited to polyelectrolytes, such as polycations and polyanions, zwitterionic polymers, such as zwitterionic polyacrylamides and copolymers and other surfactants.

Also optionally, the viscoelastic fluid as described in this disclosure, may include possible additives mentioned previously, and may also comprise materials designed to limit proppant flowback after the fracturing operation is complete by forming a porous pack in the fracture zone. Such materials, called "proppant flowback inhibitors," can be any known in the art, such as those available from Schlumberger under the name PROPNET®.

One embodiment described in this disclosure is a method of treating a subterranean formation penetrated by a wellbore with a viscoelastic fluid comprising: adding viscoelastic surfactant and nanoparticle viscosity modifier to a brine solution to produce the viscoelastic fluid. Then the viscoelastic fluid is introduced into the subterranean formation through the wellbore, where the high temperature viscoelastic fluid is subjected to temperatures greater than 250° F.

In one or more embodiments the high temperature viscoelastic fluid is subjected to temperatures greater than 275° F., and in other embodiments, the high temperature viscoelastic fluid is subjected to temperatures greater than 300° F.

EXAMPLES

Example 1

In this example, the baseline viscoelastic fluid was prepared by adding 5% by weight high temperature viscoelastic surfactant (HT VES) (Armovis® EHS) into a 30% by weight $CaCl_2$ brine. More specifically, 40.7 milliliter (mL) tap water, 26.8 grams (g) $CaCl_2 \cdot 2H_2O$, and 2.6 mL HT VES was mixed together to form the baseline fluid. The viscosity of the fluid from room temperature to approximately 350° F. was measured at a shear rate of 100 per second ($s^{-1}$) with a Fann50-type viscometer, and plotted in FIG. 1. In the second sample, 6 ppt of the carbon nanotubes (CNT, multi-walled carbon nanotubes, 95% by weight, 30-50 nanometers (nm) OD, by Cheap Tubes Inc., with the 5% impurity believed to be a carbon powder) was mixed into the baseline fluid. The viscosity was similarly measured from room temperature to 350° F., and plotted in FIG. 1. In the third sample, 12 ppt of the same carbon nanotubes was mixed into the baseline fluid. The viscosity was similarly measured from room temperature to 350° F., and plotted in FIG. 1. Averaged between approximately 250° F. and approximately 350° F., the viscosity was enhanced by approximately 20% with the addition of 6 ppt of the carbon nanotubes, and enhanced by approximately 26% with the addition of 12 ppt of the carbon nanotubes. When the carbon nanotubes were added and mixed in the same 30% $CaCl_2$ brine without the VES molecules, the dispersion of the carbon nanotubes was poor in the fluid where the nanotubes preferred to stay in aggregates. With the addition of the HT VES into the fluid, the dispersion was greatly improved, and the carbon nanotubes appeared to be distributed evenly in the fluid.

Example 2

In the first sample, the baseline viscoelastic fluid was prepared by adding 5% by weight HT VES (Armovis® EHS) into a 30% by weight $CaCl_2$ brine. More specifically, 40.7 mL tap water, 26.8 g $CaCl_2 \cdot 2H_2O$, and 2.6 mL HT VES was mixed together to form the baseline fluid. The viscosity of the fluid from room temperature to approximately 350° F. was measured at a shear rate of 100 $s^{-1}$ with a Fann50-type viscometer, and plotted in FIG. 2. In the second sample, 4 ppt of the $ZrO_2$ nanomaterial (by US Research Nanomaterials, Inc., 99.95%, 20 nm) was mixed into the viscoelastic baseline fluid. The viscosity was similarly measured from room temperature to 350° F., and plotted in FIG. 2. Averaged between approximately 250° F. and approximately 350° F., the viscosity was enhanced by approximately 24% with the addition of 4 ppt of the $ZrO_2$ nanoparticles. In the third sample, 4 ppt of the same $ZrO_2$ nanomaterial was added into the same 30% $CaCl_2$ brine without the VES. The viscosity was similarly measured from room temperature to 350° F. The viscosity of the baseline VES viscoelastic fluid in the first test and the viscosity of 4 ppt of the $ZrO_2$ nanomaterial in the third test were mathematically added (simple addition) and plotted in FIG. 2, as represented by the dotted line. The dotted line shows a lower viscosity when compared to the actual viscosity in the viscoelastic sample fluid containing both HT VES and 4 ppt of the $ZrO_2$ nanomaterial for temperatures greater than approximately 250° F. This suggests that there is a synergetic effect in the fluid between the HT VES and the $ZrO_2$ nanomaterial for enhancing the fluid viscosity at high temperatures.

Figure 2:
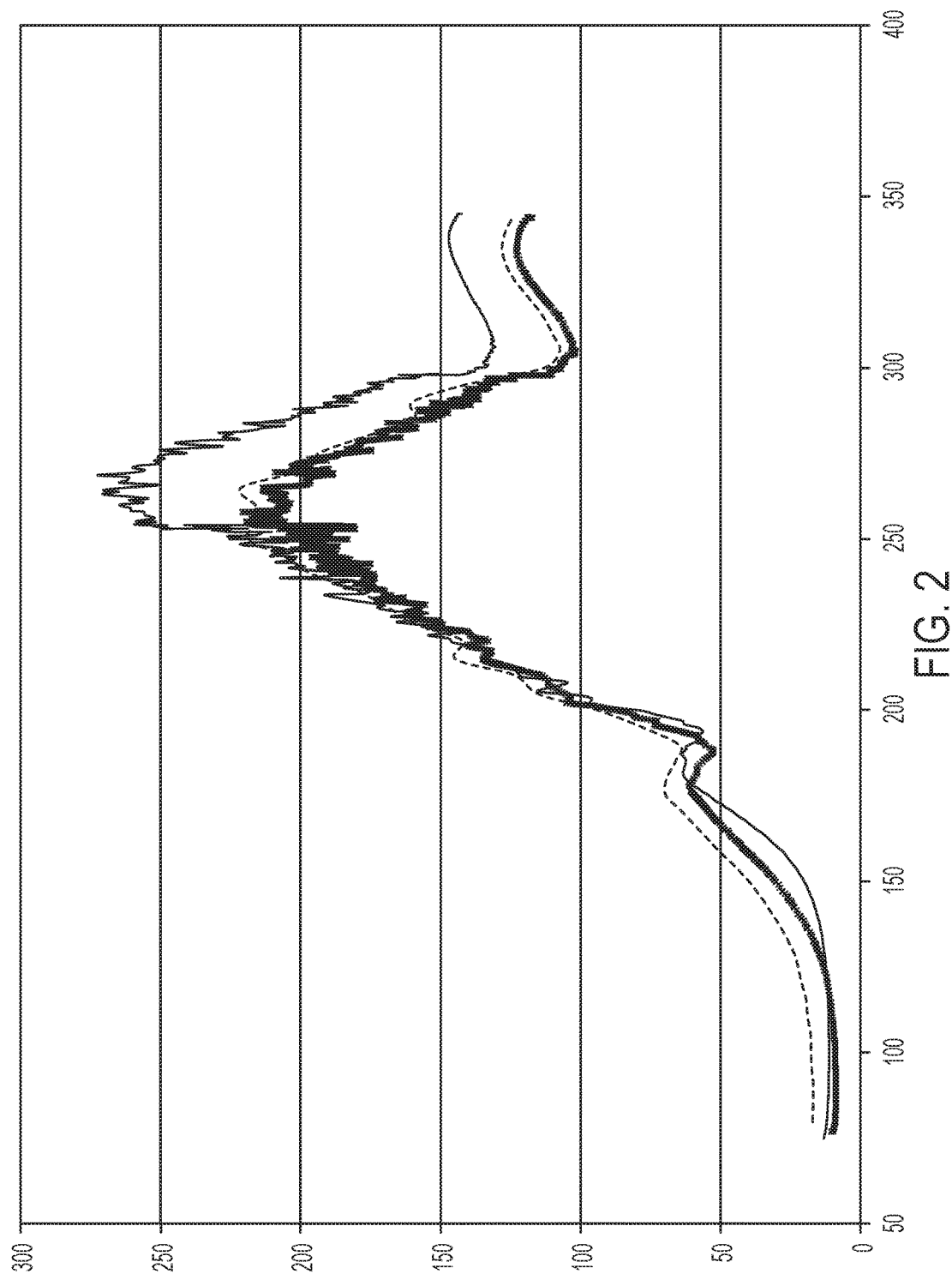

In FIG. 2, the viscosity of the baseline fluid and the viscosity of 4 ppt of the $ZrO_2$ nanomaterial are mathematically added by simple addition and plotted in FIG. 2. The expected result shows a smaller viscosity when compared to the theoretical viscosity in the viscoelastic sample fluid containing both HT VES and 4 ppt of the $ZrO_2$ nanomaterial for temperatures greater than approximately 250° F. This suggests that there is a synergetic effect in the fluid between the HT VES and the $ZrO_2$ nanomaterial for enhancing the fluid viscosity at high temperatures. The $ZrO_2$ nanoparticle may have, through forces such as van der Waals forces, simultaneously attached to multiple HT VES micelles in the fluid, thus strengthening the 3D network of the HT VES micelles and enhancing the fluid viscosity.

It should be apparent to those skilled in the art that various modifications and variations can be made to the described embodiments without departing from the spirit and scope of the claimed subject matter. Thus it is intended that the specification cover the modifications and variations of the various described embodiments provided such modification and variations come within the scope of the appended claims and their equivalents.

What is claimed is:

1. A viscoelastic fluid for a subterranean formation comprising:
viscoelastic surfactant according to the formula (I):

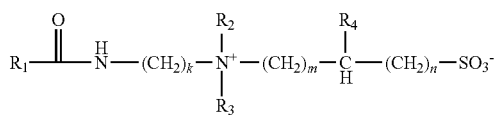

where $R_1$ is a saturated or unsaturated hydrocarbon group of from 17 carbon atoms to 29 carbon atoms, $R_2$ and $R_3$, are each independently selected from a straight chain or branched alkyl or hydroxyalkyl group of from 1 carbon atom to 6 carbon atoms, $R_4$ is selected from H, hydroxyl, alkyl, or hydroxyalkyl groups of from 1 carbon atom to 4 carbon atoms; k is an integer of from 2-20; m is an integer of from 1-20; and n is an integer of from 0-20;
brine solution; and
at least one nanoparticle viscosity modifier comprising a particle size of 0.1 nanometers to 500 nanometers, or 0.1 nanometers to 100 nanometers, where the at least one nanoparticle viscosity modifier is selected from the group consisting of $ZrO_2$ nanoparticles, carbon nanotubes, or combinations thereof.

2. The viscoelastic fluid for a subterranean formation according to claim 1, where the at least one viscosity modifier is non-polymeric.

3. The viscoelastic fluid for a subterranean formation according to claim 1, where the viscoelastic surfactant comprises erucamidopropyl hydroxypropylsultaine.

4. The viscoelastic fluid for a subterranean formation according to claim 1, further comprising solvent.

5. The viscoelastic fluid for a subterranean formation according to claim 4, where the solvent is selected from water, alcohol, or combinations thereof.

6. The viscoelastic fluid for a subterranean formation according to claim 5, where the alcohol comprises monohydric alkyloxy, diol, triol or a combination thereof.

7. The viscoelastic fluid for a subterranean formation according to claim 1, where the viscoelastic fluid comprises from 0.5% by weight to 20% by weight of the viscoelastic surfactant.

8. The viscoelastic fluid for a subterranean formation according to claim 1, where the viscoelastic fluid comprises from 1% by weight to 50% by weight of salt in the solution.

9. The viscoelastic fluid for a subterranean formation according to claim 1, where the brine solution comprises one or more metal salts or metal halides.

10. The viscoelastic fluid for a subterranean formation according to claim 1, where the brine solution comprises one or more alkali or alkaline earth metal halides.

11. The viscoelastic fluid for a subterranean formation according to claim 10, where the metal halides comprise calcium chloride, calcium bromide, zinc bromide, or combinations thereof.

12. The viscoelastic fluid for a subterranean formation according to claim 1, where the viscoelastic fluid comprises from 0.001% by weight to 5% by weight of the at least one nanoparticle viscosity modifier.

13. The viscoelastic fluid for a subterranean formation according to claim 1, where the at least one nanoparticle viscosity modifier has a particle size from 10 nanometers to 60 nanometers.

14. The viscoelastic fluid for a subterranean formation according to claim 1, further comprising breaker material.

15. The viscoelastic fluid for a subterranean formation according to claim 1, further comprising at least one additional surfactant.

16. The viscoelastic fluid for a subterranean formation according to claim 1, where the additional surfactant comprises cationic surfactant, anionic surfactant, non-ionic surfactant, amphoteric surfactant, or a combination thereof.

17. A method of treating a subterranean formation penetrated by a wellbore with a viscoelastic fluid comprising:
mixing a viscoelastic surfactant, at least one nanoparticle viscosity modifier, and a brine solution to produce the viscoelastic fluid, the viscoelastic surfactant according to formula (I):

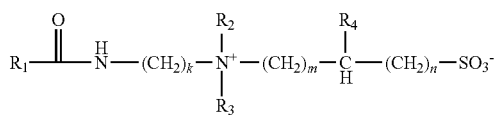

where $R_1$ is a saturated or unsaturated hydrocarbon group of from 17 carbon atoms to 29 carbon atoms, $R_2$ and $R_3$, are each independently selected from a straight chain or branched alkyl or hydroxyalkyl group of from 1 carbon atom to 6 carbon atoms, $R_4$ is selected from H, hydroxyl, alkyl or hydroxyalkyl groups of from 1 carbon atom to 4 carbon atoms; k is an integer of from 2-20; m is an integer of from 1-20; and n is an integer of from 0-20; and
the at least one nanoparticle viscosity modifier comprising a particle size of 0.1 nanometers to 500 nanometers, or 0.1 nanometers to 100 nanometers, where the at least one nanoparticle viscosity modifier is selected from the group consisting of $ZrO_2$ nanoparticles, carbon nanotubes, or combinations thereof; and
introducing the viscoelastic fluid into the subterranean formation through the wellbore, where the treatment fluid is subjected to temperatures greater than 250° F.

18. The method of treating a subterranean formation penetrated by a wellbore with the viscoelastic fluid according to claim 17, where the treatment fluid is subjected to temperatures greater than 275° F.

* * * * *